United States Patent Office.

EDWARD DE LA GRANJA, OF BOSTON, MASSACHUSETTS.

Letters Patent No. 72,272, dated December 17, 1867.

IMPROVEMENT IN DEODORIZING INDIA RUBBER, GUTTA PERCHA, &c.

*The Schedule referred to in these Letters Patent and making part of the same.*

TO ALL WHOM IT MAY CONCERN:

Be it known that I, EDWARD DE LA GRANJA, of Boston, in the county of Suffolk, and State of Massachusetts, have invented a new and useful Improvement in Deodorizing and Perfuming India Rubber and Gutta Percha; and I do hereby declare the following to be a full, clear, and exact description of the same, sufficient to enable others skilled in the art to which the invention appertains, to make use of it.

My invention is designed for the deodorizing, and, if desired, the perfuming also, of all kinds of India rubber and gutta percha, either vulcanized or not, and before or after being moulded into articles of use for any required purpose.

I steep or macerate the India rubber or gutta percha, as the case may be, in a solution composed of iodine, permanganate of potash, iodide of potassium, glycerine, sulphite of soda, sulphite of lime, sulphite of potassa, and water. This macerating process I carry out for twenty-four hours in a close earthen or china vessel, the solution being all the time cold. At the end of the twenty-four hours, I gradually heat the solution containing the India rubber or gutta percha, in the same earthen or china vessel, until it reaches the boiling-point, at which degree of heat I keep the solution, uncovering the vessel, until one-eighth part of it is lost by evaporation. The India rubber or gutta percha I allow to remain in the solution until it becomes quite cold, when I take it out and expose it to a current of fresh air.

Having thus deodorized the India rubber or gutta percha, I next proceed to perfume it if desired, by subjecting it to a dry heat below the melting-point, and steeping it while hot in an aqueous or alcoholic aromatic solution of any desired strength, and perfumed *ad libitum*.

The elementary proportions of the solution for deodorizing India rubber and gutta percha are, iodine, fifteen grains; permanganate of potassa, twenty-four grains; iodide of potassium, sixty grains; glycerine, four ounces; sulphite of soda, four ounces; sulphite of lime, four ounces; sulphite of potassa, four ounces; water, one gallon and a half to two gallons.

Having thus described my invention, what I claim as new, and desire to secure by Letters Patent, is—

1. The solution above described, when used as and for the purpose specified.
2. The process of deodorizing and perfuming India rubber and gutta percha above described.

To the above specification of my improvement, I have signed my hand, this 14th day of October, 1867.

EDWARD DE LA GRANJA.

Witnesses:
  I. N. RICHARDSON,
  J. E. BATES.